United States Patent [19]

Pettingell et al.

[11] 4,050,297
[45] Sept. 27, 1977

[54] MEASURING ELECTRICAL PARAMETERS OF AN INTERNAL COMBUSTION ENGINE DURING CRANKING

[75] Inventors: James R. Pettingell, Granby; Lee R. Armstrong, Enfield, both of Conn.

[73] Assignee: United Technologies Corporation, Hartford, Conn.

[21] Appl. No.: 684,032

[22] Filed: May 7, 1976

[51] Int. Cl.² .................................... G01M 15/00
[52] U.S. Cl. .................................... 73/117.2
[58] Field of Search .............. 73/116, 117.2, 115, 73/117.3

[56] References Cited

U.S. PATENT DOCUMENTS 3,713,331  1/1973  Petersen et al. .................. 73/117.2
3,765,233  10/1973  Germann ............................ 73/117.2

Primary Examiner—Jerry W. Myracle
Attorney, Agent, or Firm—M. P. Williams

[57] ABSTRACT

Diagnostic apparatus, connected to probes for sensing conditions or parameters of an internal combustion engine during non-combustion cranking of the engine, reads electrical conditions at times related to the crank angle of the engine. Electrical tests are made at times indicated by peaks and valleys in the starter current or voltage waveform, the average of these providing load-compensated indications of true electrical parameters, to eliminate effects of battery loading variations due to compression-induced variations in cranking power required.

9 Claims, 5 Drawing Figures

MEASURING ELECTRICAL PARAMETERS OF AN INTERNAL COMBUSTION ENGINE DURING CRANKING

CROSS REFERENCE TO RELATED APPLICATIONS

The subject matter herein may be used in conjunction with the subject matter disclosed and claimed in commonly owned copending applications filed on even date herewith by Rackliffe et al., Ser. No. 684,220, entitled SUB-CYCLIC MEASUREMENT OF SPEED OF AN INTERNAL COMBUSTION ENGINE; and by Tedeschi. Ser. No. 684,221, entitled ENGINE, CYLINDER IDENTIFICATION (CID) TRANSDUCER.

BACKGROUND OF THE INVENTION

1. Field of the Invention

This invention relates to diagnosing internal combustion engines electronically.

2. Description of the Prior Art

The diagnosing of internal combustion engines utilizing electronic means has long been known in the art. The most widely used type of diagnostic system relies heavily on display of the actual signals and conditions sensed in the engine for analysis by an operator. Systems more recently put in use tend more toward automatic analysis of the signals and conditions sensed on an engine, with analysis and reduction of the data so as to provide conclusionary results in the form of output signals and/or digital displays indicative of the engine condition and/or suggested repair procedures. The more automated systems, however, cannot perform analytical interpretation of the signals actually sensed, relying solely on the samples taken, and therfore either lose information or must by synchronized with other relevant events in order to take measurements in proper relationship to other events and conditions in the engine. Thus although the automated systems avoid human error, they can instead introduce machine error.

One example of this is found in making electrical measurements (such as of the battery, the starter voltage and the like) during the cranking of the engine by an electrical starting system. In the past, it has been recognized that automated systems, which sample the electrical parameters during cranking, have given less than optical results, the results at times being totally useless in diagnosing conditions which are extant in the engine.

SUMMARY OF THE INVENTION

The object of the present invention is to provide reliable electrical analysis of an internal combustion engine while cranking.

This invention is predicated on the discovery that electrical measurements made at random during the cranking of a reciprocating engine are erratic due to the excessive variations in required cranking power during various portions of an engine cranking cycle as a consequence of engine compression characteristics.

According to the present invention, the magnitude of a parameter related to engine cranking power variations is monitored, and electrical measurements are made at times related to the variations in magnitude, whereby the integrity of the electrical measurements is ensured. According further to the invention, measurement of electrical parameters of an internal combustion engine while cranking are made in synchronism with maxima and minima (peaks and valleys) of the magnitude of a parameter varying with cranking power, such as starter current magnitude, starter voltage magnitude, and instantaneous sub-cyclic engine cranking speed, whereby the measurements are known to be made in a given relationship to maximum and minimum loading of the battery. According still further to the invention, measurements made at a point in time following the sensing of a peak in cranking power magnitude and measurements made at a point in time following the sensing of a valley in cranking power magnitude are averaged to provide the output indications of electrical measurements, whereby any tendency for the measurements to vary above or below an average value, as a function of high or low drain on the battery, will average out.

The invention provides a relatively simple way of very accurately measuring electrical parameters of an internal combustion engine while cranking.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENTS

Figure 1:
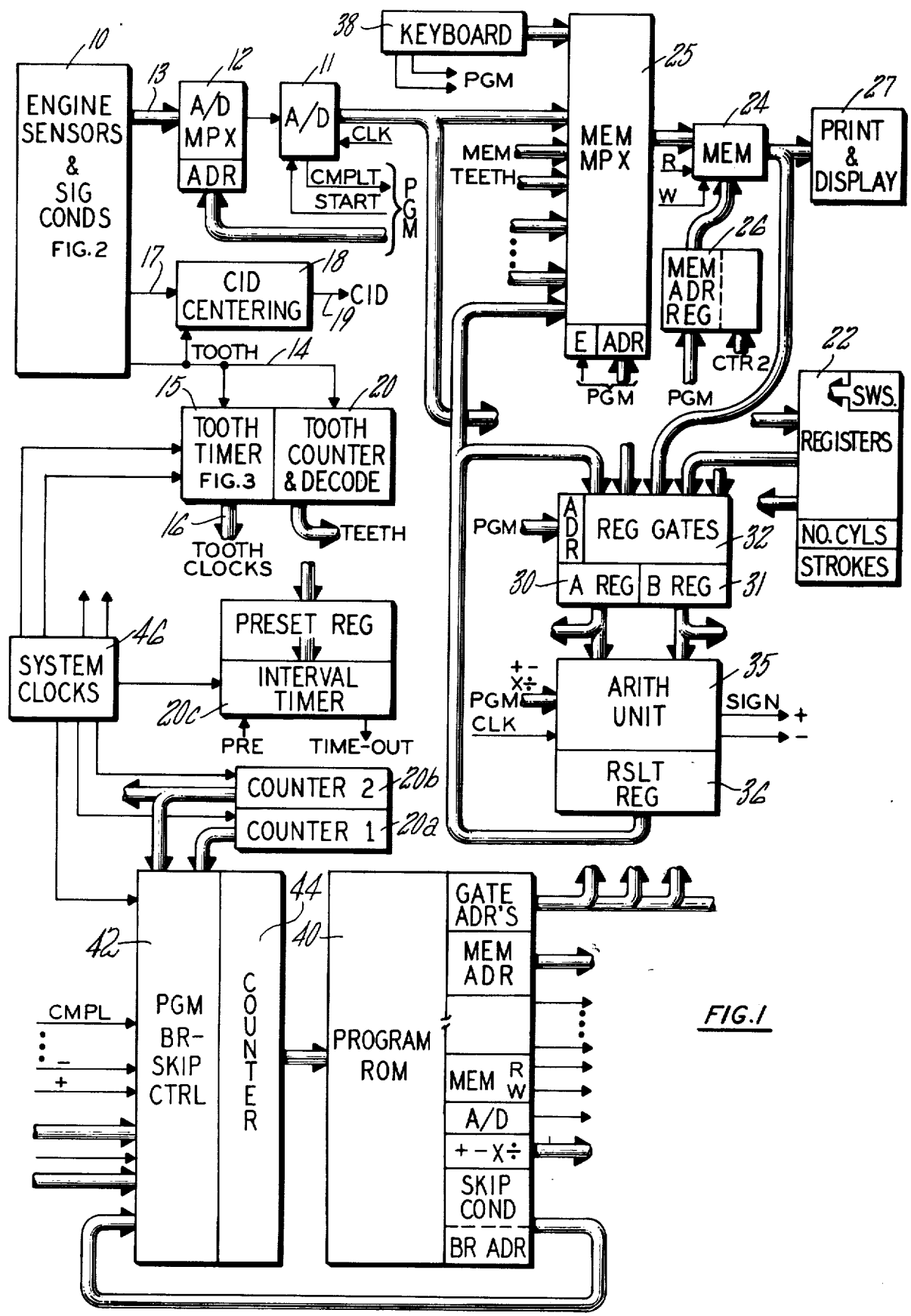
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the register 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
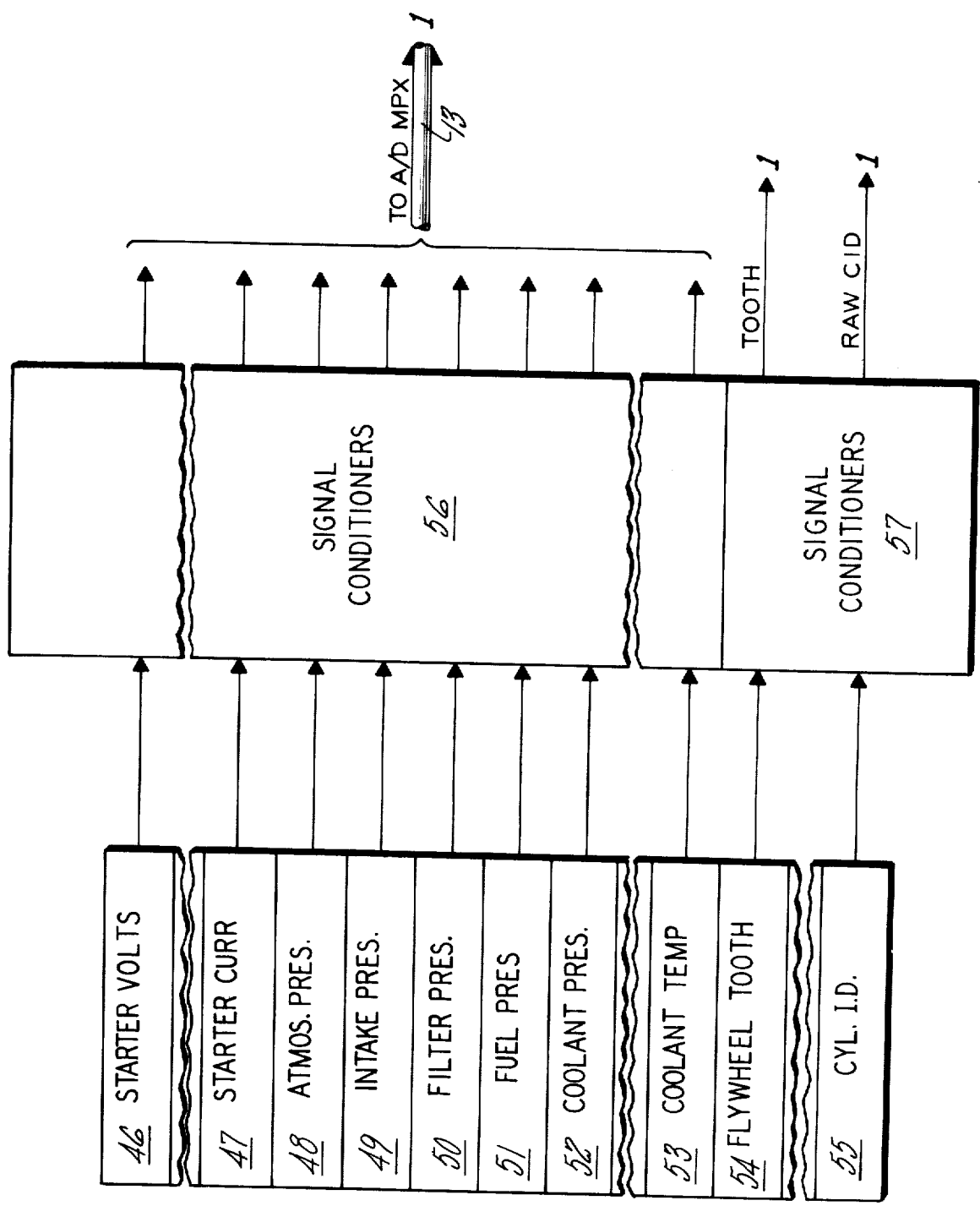
FIG. 2 is a simplified block diagram of engine parameter sensing apparatus for use in the embodiment of FIG. 1.

Referring now to FIG. 2, a plurality of engine sensors in a diagnostic system incorporating the present invention may include, among other not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
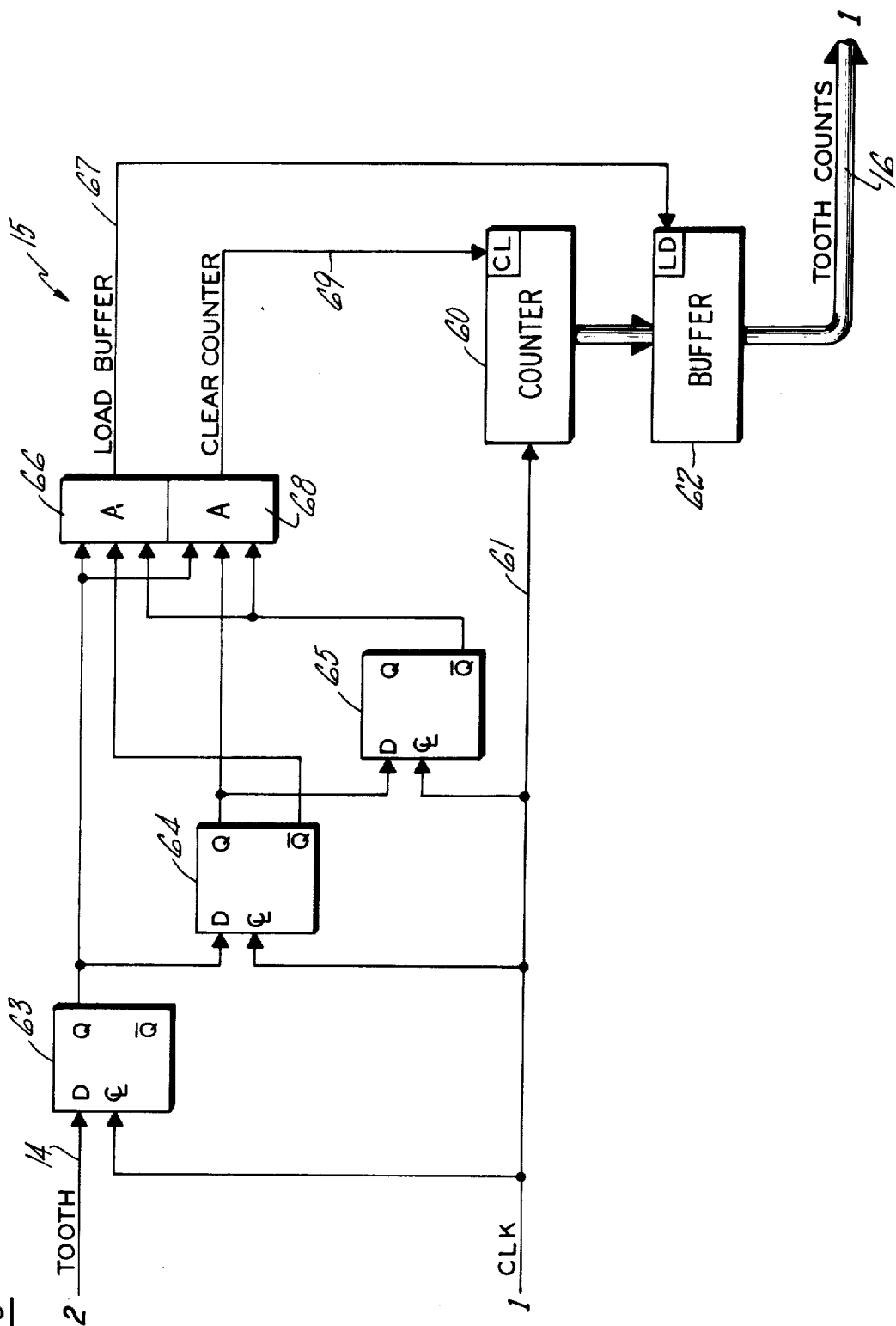
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear inputof the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 53–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al, Ser. No. 684,037, entitled "Determination of Number of Teeth on an Internal Combustion Engine Flywheel". Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

Figure 5:
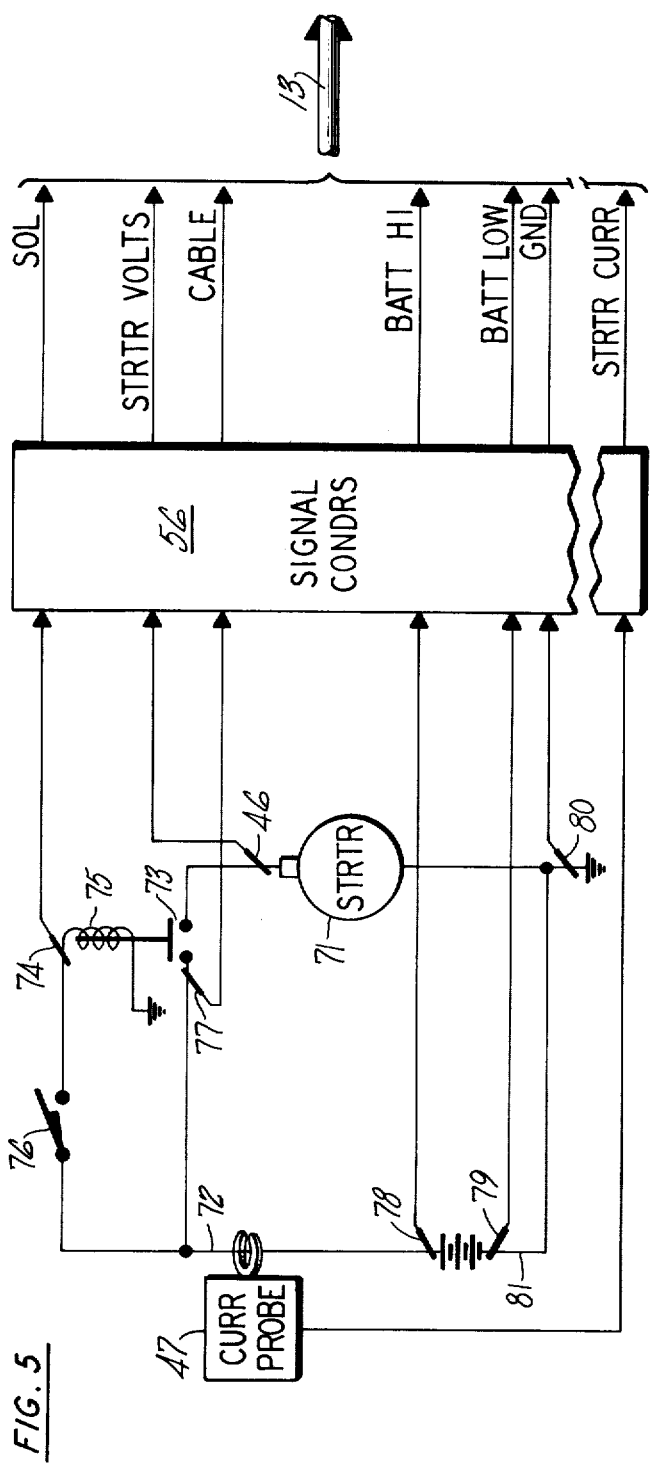
FIG. 5 is a simplified block diagram of the starter system of an engine with probes which may be used in a diagnostic system incorporating the invention.

Referring now to FIG. 5, a simplified schematic of an electric starter system of an internal combustion engine, of the type which may be diagnosed by a diagnostic system incorporating the present invention, includes the starter voltage probe or clamp 46 which is connected directly to the starter motor 71 at the point of application of battery current thereto, and the starter current probe 47 which is clamped around the battery cable 72 leading to the starter solenoid contacts 73. In order to provide full electrical analysis of the starter system, additional parameters must be sensed. Therefore, a clip 74 is connected between the starter solenoid coil 75 and the starter switch 76 (typically the key operated ignition switch). Also, a clip 77 is provided to monitor the voltage on the solenoid at the point where the battery current is applied for application to the starter 71. Clips or clamps 78–80 are also applied to both sides of the battery itself, as well as to the low or vehicle side of the battery ground strap 81, respectively. Each of these voltage probes or clips is connected to respective ones of the signal conditioners 56 so as to provide signals, suitably conditioned and level adjusted for the A/D converter 11, on the plurality of lines 13.

Figure 4:
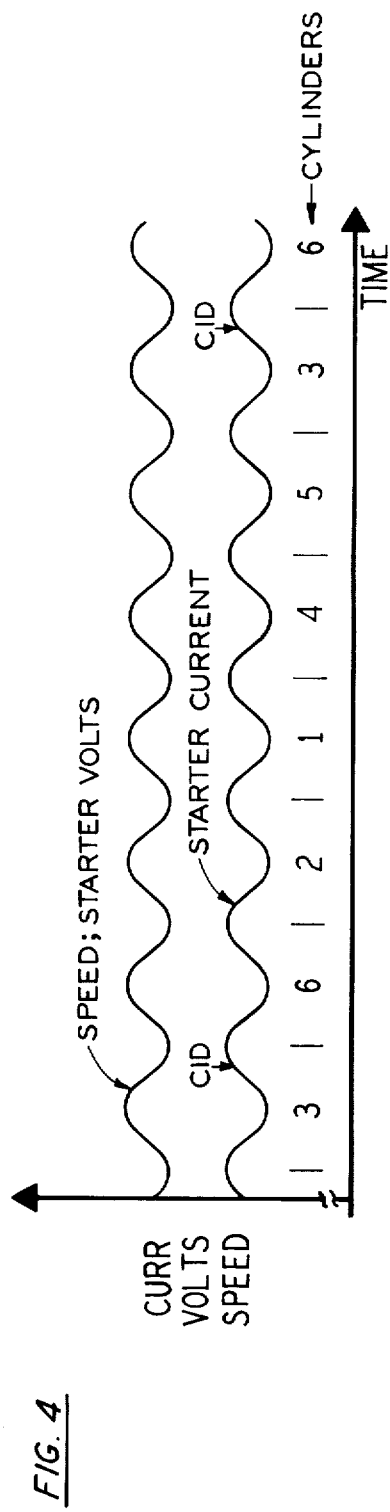
FIG. 4 is a diagramatic illustration of principles of the invention.

The present invention senses on a sub-cyclic basis, related to the compression strokes of the individual cylinders, an indication of the cranking power required, which therefore provides an indication of the drain on the battery at various moments in times. Referring to FIG. 4, there is shown an upper plot of speed and starter volts as a function of time and a lower plot of starter current as a function of time, below which the individual cylinder portions of a cycle of a typical firing order are shown. An identification signal which divides the rotation of the engine into cycles (one revolution for a two stroke engine or two revolutions for a four stroke engine), and also identifies the power stroke of a particular cylinder with which it relates, is provided as described hereinbefore by a CID signal on a line 19 (FIG. 1) as presented by a CID centering device 18, which may be of the type disclosed and claimed in the aforementioned copending application of Tedeschi. CID signal is assumed herein to be placed so as to sense opening of the intake valve of the number six cylinder. Referring to FIG. 4, the speed of the engine when cranking is a function of the power applied to it, and the power applied to it is a function of the power required to turn it, since the power determines the current drain on the battery, and the battery current drain determines the voltage and therefore the power available from the battery, all as is well known in the art. Therefore, cranking of a reciprocating engine has sub-cyclic excursions of speed, starter volts and starter current, the speed and voltage being in phase and the starter current being out of phase with the starter volts.

In order to analyze the electrical health of the engine, measurements made as indicated by the schematic of FIG. 5 must be reasonable accurate. One measurement of interest is the voltage drop across the ground strap 81; obviously, if the voltage at the clip 79 is made during a nominal power stroke of the engine, where the compression is low, the speed of the engine is therefore high and the starter current is therefore low, so the current-related voltage drop across the ground strap 81 will also be low, and may not reflect a current-related problem in the ground strap. Further, a voltage measurement of the starter cable 72 requires measuring the voltage at the clip 78 and measuring the voltage at the clip 77. If the voltage at the clip 78 is measured during a period of low current drain when the battery voltage is high and the voltage at the clip 77 is measured during the period of high current drain when the battery voltage is low, an excessive voltage drop could be indicated, thereby indicating a bad cable 72 when in fact the cable is not bad. To the contrary, if the voltage at the clip 78 is measured during high current drain and the voltage at the clip 77 is measured during low current drain then the initial low voltage followed by the higher battery voltage driving the cable 72 could provide an indication of a voltage gain across the cable 72, which is, of course, totally erroneous. From the foregoing, it can be appreciated that random electrical measurements made during cranking can be said to provide no information whatsoever, giving erratic, erroneous results which are of no value in diagnosing the health of the electric system of the engine.

The present invention monitors the fluctuations related to sub-cyclic power requirement variations as the engine is cranking and makes measurements in relationship therewith. It should be appreciated from FIG. 4 that one could measure speed or starter volts or starter current and take measurements in cognizance thereof, which measurements would avoid the difficulties described hereinbefore. Further, there is the opportunity to take all of the measurements at peaks, at valleys, halfway in between, or averaging measurements taken at different times. The embodiment described hereinafter takes measurements related to maxima (peaks) and then takes measurements related to minima (valleys), each parameter being measured with respect to a maximum and a minimum, and, if desired, those measurements can be averaged. When done in this fashion, it should be understood that measurements taken with respect to a valley will not all be taken at the same instant in time if A/D conversion must be completed for each measurement before the next one is taken; thus there may be as much as 40° or 60° delay from sensing a valley until a particular one of the parameters of FIG. 5 is measured; however, there would be a commensurate delay from sensing a peak to the time of measuring the same parameter the second time. This means if the parameters uphold an order once in response to a valley and once in response to a peak, each parameter will vary from an average value by the same amount with respect to the peak and the valley and therefore the time delay is immaterial.

A typical program for measuring electrical parameters in response to excursions in the engine cranking utilizing the exemplary processing apparatus in FIG. 1 is set out hereinafter, as a subset of instructions which are identified with numbers for clarity. In this example, starter current is used to monitor engine condition so as to determine when to make electrical tests; however, that fact is manifested simply by which of the parameters is selected by the A/D multiplexer, which in turn is governed by the particular input gate address applied to the A/D multiplexer 12 by the program. Simply by altering that address in each instruction which is sensing a peak or a valley will cause the apparatus to be responsive to starter voltage; on the other hand, the apparatus may be responsive to speed, eliminating the need for A/D conversion as is described hereinafter.

Referring now to FIGS. 1 and 4, it may be desirable to enhance system operation reliability by utilizing the CID signal as one of the indicators in the processing of information relating to cylinder position, to give greater assurance that the desired conditions (maxima and minima in the engine waveform) are sensed. For instance, the particular parameter being monitored (current, volts or speed) may have noisy signals on a given engine (due to particular faulty conditions in the engine), or on a given day due to noise on electrical power lines, weather conditions or the like. Thus the CID signal may be used together with sensing of a first peak in the current waveform (as is described in the exemplary program hereinafter) as a test initiation precedure. However, it should be understood that this is not necessary, and can be eliminated, if desired. For initializing with the CID signal and a first peak, the program steps are:

1. Reset counters 1 and 2
2. Sense CID; skip one if yes
3. Branch to 2

Once the CID has been sensed, then the task is to sense a peak which simply assures that regardless of the particular placement of the CID, knowledge of where the program is with respect to analyzing the conditions in the cranking characteristic of the engine will be assured. In this embodiment, to find a peak, the processing system will monitor the starter current until it has four samples, including a selected data point and three succeeding data points which are greater (not equal to and not less than) the selected data point, which shows that the waveform has a positive slope. Then the peak itself is detected by finding the next immediate negative slope as a selected data point for which the next three succeeding data points are definitely less than (not equal to and not greater) than the selected data point. This selected data point is taken as the peak. The program steps for finding the peak may be:

4. Reset Counter 1
5. A/D to Curr; Start A/D
6. Skip one if A/D CMPLT
7. Branch to 6
8. Load A/D to A Reg
9. A/D to Curr; Start A/D
10. Skip one if A/D CMPLT
11. Branch to 10
12. Load A/D to B Reg
13. Subtract (A − D); Skip one on (−)
14. Load B Reg to A Reg; Branch to 9

At this point, this system has learned that the first sample is not less than the second sample since subtracting the first from the second has resulted in a positive sign meaning that the answer is not negative, which would be the case if the second sample were in fact greater than the first sample. So the second sample is then taken as the selected data point by moving it from the B register into the A register. (It should be noted that in a system having less hardware and more complicated programming, the operands could have been loaded to addresses in memory set aside for that purpose, and the exchange could be made simply through memory addressing, in a very well known fashion. In this case, the second operand is available and, due to the failure of the test, it is simply moved to the A register to become the selected operand.) Then a new sample is brought in and compared with the selected sample by means of steps 9 through 13 and this is repeated until finally a beginning of a positive slope is detected by a negative result from the adder. Any time that the wrong relationship between the samples is indicated, the procedure starts over again so that four successive samples in a row have the right relationship. Thus even after two or three correct matches, if the fourth match is wrong, then at least four additional data points will be sensed looking for the positive slope. Whenever a single correct relationship is sensed, a second relationship is looked for (comparing the selected data point against the second subsequent sample to see if it has the proper relationship as well) and then the third, until counter one is equal to three, meaning three successful comparisions to the three subsequent samples have been made with the selected sample, according to the following steps:

15. Advance Counter 1
16. Skip one if Counter 1 = 3
17. Branch to 9

By sensing that counter 1 is equal to 3, the system has just determined that the selected data point has been followed by three data points of lesser value, indicating a negative slope, which, because it follows the positive slope determined in instructions 4–17, indicated a peak. In the present instance, the peak is simply used as a precursor along with the sensing of the CID signal to assure the system of the particular point in operation of the engine which it is monitoring, in order to give greater reliability to the peak and valley sensing which is done hereinafter (for which, in each case, electrical parameters of the engine will then be sensed, as described hereinbefore). Therefore, all that needs to be kept track of is the fact that only the first peak has been found, by means of counter two as follows:

32. Skip one if Counter 2 = 0
33. Branch to 93

Having found a precursor peak, the system is now interested in finding a first valley at which time it will take electrical measurements. The determination of finding a valley is precisely commensurate to the determination of finding the peak, except the negative slope is found first and the positive slope is found second.

34. A/D to Curr; Start A/D
35. Skip one if A/D CMPLT
36. Branch to 35
37. Load A/D to B Reg
38. Reset Counter 1
39. A/D to Curr; Start A/D
40. Skip one if A/D CMPLT
41. Branch to 40
42. Load A/D to A reg
43. Subtract (A − B); Skip one on (−)
44. Load B Reg to A Reg; Branch to 39
45. Advance Counter 1
46. Skip one if Counter 1 = 3
47. Branch to 39
48. A/D to Curr; Start A/D
49. Skip one if A/D CMPLT
50. Branch to 49
51. Load A/D to A Reg
52. Reset Counter 1
53. A/D to Curr; Start A/D
54. Skip one if A/D CMPLT
55. Branch to 54
56. Load A/D to B Reg
57. Subtract (A − B); Skip one on (−)
58. Load B Reg to A Reg; Branch to 53
59. Advance Counter 1
60. Skip one if Counter 1 = 3
61. Branch to 53

The processing apparatus has detected a valley which is the first point in the engine operating characteristic following which electrical parameters are to be recorded. As shown in the instructions 62 through 69, four instructions are required in order to load each electrical parameter in memory. For simplicity instructions 70–89 are lumped in terms of the four instructions. The instructions for loading the parameters in response to the valley are as follows:

62. A/D to Curr; Start A/D
63. Skip one if A/D CMPLT
64. Branch to 63
65. Load A/D to MEM XX0000
66. A/D to GND
67. Skip one if A/D CMPLT
68. Branch to 67
69. Load A/D MEM XX0010
70–73. Batt Lo to MEM XX0100
74–77. Batt Hi to MEM XX0110
78–81. Cable to MEM XX1000
82–85. STRTR VOLTS to MEM XX1010
86–89. SOL to MEM XX1100
90. Advance Counter 1
91. Branch to 4

Having recorded the electrical parameters for the valley, the program switches back to instruction 4 and finds a peak as described hereinbefore with respect to instructions 4–31. In instruction 32 is senses that counter 2 is set to a one so it does not skip instruction 33 which causes it to branch to instruction 93 to store electrical parameters in exactly the same fashion as in instructions 62–89 except for the fact that each of the memory addresses is one bit higher this time, as follows:

93. A/D to Curr; Start A/D
94. Skip one if A/D CMPLT
95. Branch to 94
96. Load A/D to MEM XX0001
97. A/D to GND
98. Skip one if A/D CMPLT
99. Branch to 98
100. Load A/D to MEM XX0011
101–104. Batt Lo to MEM XX0101
105–108. Batt Hi to MEM XX0111
109–112. Cable to MEM XX1001
113–116. STRTR VOLTS to MEM XX1011
117–120. SOL to MEM XX1101

Depending upon the use to be put to the parameters derived, simply recording the parameters for subsequent print or display, with analysis to be made thereof by trained personnel, may be all that is required. On the other hand, in a preferred form of the invention, the peak and valley measurements made are averaged, and the average value is utilized. This may be accomplished, for starter current, as follows:

121. Load MEM XX0000 to A Reg
122. Load MEM XX0000 to B Reg
123. Add
124. Load RSLT to A Reg
125. Load Factor 2 to B Reg
126. Divide
127. Load RSLT to MEM XX0001

In a similar fashion, succeeding instructions are utilized to add the related factors and divide them by two and store them back in one of the related memory locations, in the same fashion as instructions 121–127 except in successively higher ordered memory locations, as illustrated briefly by the following sets of seven instruction steps:

128–134. XX0010 + XX0011   2 = XX0011
135–141. XX0100 + XX0101   2 = XX0101
142–147. XX0110 + XX0111   2 = XX0111
148–158. XX1000 + XX1001   2 = XX1001
159–164. XX1010 + XX1011   2 = XX1011
165–171. XX1100 + XX1101   2 = XX1101

At this point, there has been recorded in memory the average of each electrical parameter desired to be sensed as illustrated in FIG. 5, which may be utilized in any desired fashion. For instance, routines to print or display the information may be used at this point if desired. Or, in a sophisticated diagnostic system, the information may typically be retained in memory at this point in time, while other diagnostic procedures and data collection routines are performed. Thereafter, this information may be read out with other information and/or processed in any desired fashion.

As alluded to briefly hereinbefore, the particular nature of the data processing apparatus, and therefore the commensurate required program form no part of the present invention. In fact, the peak and valley detecting can be achieved in an obvious fashion utilizing analog peak and valley detectors applied to the electrical current waveform, or a single analog peak detector may be applied to the current for storing one set of parameters and to the starter voltage for storing another set of parameters.

The foregoing exemplary program steps illustrate the utilization of starter current to determine the excursions in the engine operating condition in order to tell when to take the electrical measurements. In an extremely obvious fashion, the starter voltage could be used instead; all that need be done is to address the A/D multiplexer to the starter voltage rather than to the starter current during peak and valley detecting, and the system will operate quite well. If desired, to save time, a first voltage valley can be sensed as a precursor to sensing a voltage peak and a voltage valley for taking measurements in the fully analogous fashion to the present invention; however, as long as the two extremes (maxima and minima) are sensed, it doesn't matter which order they are sensed, nor is sensing the very first peak or valley mandatory.

Although the invention has been shown as responding to an electrical parameter of the starter, which provides an indication of the excursions of engine operating conditions, in order to determine the time to take the two sets of electrical measurements, the engine excursions may instead be sensed directly by speed. An exemplary substitute program portion of sensing a valley in speed (equivalent to a peak in starter current) is as follows:

1. Reset Counters 1 and 2
2. Sense CID; Skip one if yes
3. Branch to 2
4. Reset counter 1
5. Load Tooth timer to A Reg
6. Start Interval timer
7. Skip one if time = 20 ms
8. Branch to 7
9. Load Tooth timer to B Reg
10. Subtract (A − B); Skip one on −
11. Load B Reg to A Reg; Branch to 6
12. Advance counter 1

13. Skip one if counter 1 = 3
14. Branch to 6

A time delay is used in instructions 7 and 8 simply because adjacent tooth times are so close to each other as not necessarily indicative to a tendency of the slope to be increasing, due to engine perturbations and general noise. However, that time interval is adjustable and may in a system in which the tooth sensing and signal conditioning is carefully implemented, be reduced substantially or eliminated. Similarly, the branching based on the count in counter 1 can be conditioned on a higher number of counts so that a longer interval is utilized before saying that the trend is accepted as a positive slope. The detecting of negative slope to determine the actual peak, and the detecting of negative and positive slopes to determine the position of a valley, is fully commensurate with the example given hereinbefore for current sensing, as modified as indicated by the positive slope detecting set out above in response to the tooth timer.

Once a peak is found, the data processing apparatus immediately finds a second negative slope, after the one which identifies the peak, indicating that a valley is being approached; this is done wholly independently in the present embodiment, though in some instances it need not necessarily be. Once the negative slope is sensed looking for a valley, the program immediately switches to looking for a positive slope (as in instructions 48–61); but since the negative slope is sensed immediately following a peak, the program will continuously be rejecting data points, and selecting new data points, until the actual peak is reached. However, this poses no problem and does provide for sensing the first data point which represents a valley, as indicated by the positive slope resulting from three following data points being of greater magnitude.

If desired, the magnitude of the starter current at the peak and the magnitude of the starter current at the valley could be averaged, but a single reading taken of all the parameters instead of averaging each of them, with the single reading taken when the system senses the average reading; similarly, taking readings at average voltage or speed may be done within the purview of the invention. Various architectures and programs may be used, and in fact analog methodology which is obvious in view of the details set out hereinbefore could equally well be used to detect the peaks and the valleys if necessary in a given low cost embodiment.

Because of the fact that the first set of parameters and the second set of parameters are read and loaded into memory with identical programming, the only time variations involved is the actual analog to digital conversion time which may vary slightly as a function of the particular numbers to be converted. However, it should be appreciated that the starter current will be read substantially at the valley and substantially at the peak, and on the other hand the solenoid voltage will be measured 20° to 40° following the valley but it will be measured 20° to 40° following the peak. Thus the averaging eliminates any need to take each of the electrical parameters at precisely a peak or a valley or at any other point in the perturbation of the engine operating condition.

Similarly, although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which can we claim as new and desire to secure by Letters Patent is:

1. Apparatus for recording the magnitudes of electrical parameters of a reciprocating internal combustion engine having an electric starter motor, during cranking of the engine, comprising:

sensing means adapted to be disposed for response to the magnitude of an engine parameter which varies in conjunction with the power required to crank the engine, said magnitude having maxima and minima associated with each cylinder thereof, said sensing means providing a corresponding cranking signal;

a plurality of electrical probes disposed for response to various portions of the electric system associated with the engine, each providing an electric signal manifestation of the magnitude of the related electrical parameter; and processing means responsive to said cranking signal for determining the time of an extreme magnitude in the excursions of magnitude of said cranking signal and for recording each of said electrical magnitude signals in timed relationship with said extreme magnitude of said cranking signal.

2. Apparatus according to claim 1 wherein said processing means records each of said electrical magnitudes in timed relationship to a peak in the magnitude excursions of said cranking signal excursions and also records each of said electrical signals in timed relationship to a valley in the magnitude excursions of said cranking signal.

3. Apparatus according to claim 2 wherein said processing means also includes means providing as an ouput indication, for each of said electrical parameters, the average of the magnitude determined in time relationship to a maximum of said cranking signal with that determined in time relationship to a minimum of said cranking signal.

4. Apparatus according to claim 1 wherein said parameter is starter current and said sensing means includes a starter current probe.

5. Apparatus according to claim 1 wherein said parameter is starter voltage and said sensing means includes a starter voltage probe.

6. Apparatus according to claim 1 wherein said parameter is instantaneous, sub-cyclic speed and said sensing means includes speed measuring means for instantaneously providing indications of the rotational speed of the engine several times within each cylinder-related stroke thereof.

7. In a method of recording the magnitudes of electrical parameters of a reciprocating internal combustion engine having an electric starter motor, during cranking of the engine, the steps of:

determining the time of an extreme magnitude in the excursions of magnitude of an engine parameter which varies in conjunction with the power required to crank the engine, said magnitude having maxima and minima associated with each cylinder thereof; and recording in timed relationship with said extreme magnitude of said engine parameter the magnitude of each of a plurality of electrical parameters of various portions of the electric system associated with the engine.

8. A method according to claim 7 wherein each of said electrical magnitudes is recorded in timed relationship to a maximum in the magnitude of said engine parameter excursions and also in timed relationship to a minimum in the magnitude of said engine parameter excursions.

9. In a method according to claim 8, the further step of:

providing as an output indication, for each of said electrical parameters, the average of the magnitude determined in time relationship to a maximum of said cranking signal with that determined in time relationship to a minimum of said cranking signal.

* * * * *